Patented Aug. 17, 1948

2,447,396

UNITED STATES PATENT OFFICE 2,447,396

PREPARATION OF STABLE MEDICINAL SALTS OF ACETYLSALICYLIC ACID

Myer Coplans, Hendon, London, England

No Drawing. Application September 10, 1946, Serial No. 696,029. In Great Britain May 17, 1946

9 Claims. (Cl. 167—65)

The spontaneous hydrolysis of the alkaline and alkaline earth salts of acetylsalicyclic acid, particularly the calcium and magnesium acetylsalicylates ("calcium aspirin" and "magnesium aspirin"), has been considerably retarded by the incorporation during their preparation of a comparatively small quantity of the chloride of calcium or magnesium, the products being subsequently dried at a temperature of 60° C. or below. (See British specification No. 315,330.) The proportion of chloride incorporated (as anhydrous salt) has been from 5 to 7 per cent on the weight of the dry material.

By reason of the improved stability so conferred the product has proved marketable when subsequently stored at ordinary air temperatures in a temperate climate for about a year. During the period of storage the amount of free salicyclic acid (or salicylate) and acetic acid developed during hydrolysis is about one per cent in excess of that initially present on completion of the drying process.

The presence of appreciable quantities of free acid thus developed causes a disagreeable odour and taste which makes the product somewhat unpalatable. Further, my experiments have shown that hydrolysis is accelerated as the amount of acetic or salicyclic acid present increases.

Owing to the proportion of chloride present the product is somewhat hygroscopic and readily absorbs moisture from the atmosphere if left exposed for any length of time. This absorbed moisture nullifies considerably the protective (i. e., stabilising) action of the hitherto dried product and a product so exposed should be re-dried.

According to the present invention, the hydrolysis of calcium acetylsalicylate and of magnesium acetylsalicylate, incorporating calcium chloride or magnesium chloride respectively, is reduced or retarded to an improved extent by causing the product, in the course of its preparation, intimately to incorporate, respectively, a small proportion of finely distributed calcium carbonate or magnesium carbonate (more particularly the basic magnesium carbonate containing magnesium carbonate and magnesium oxide). The preparation of the final product is completed by drying at a temperature of preferably 45–50° C. I have found that the incorporation of as little as 0.15% of the carbonate exerts an appreciable effect in retarding hydrolysis, but I prefer to have about 0.25 to 0.4%. If considerably more than 0.4% is present the product when dissolved in water yields a solution which may be undesirably turbid.

The improved stabilising effect obtainable according to the invention means that the product may be kept in marketable condition, substantially free from disagreeable odour and taste, for considerably longer periods than has hitherto been possible.

I have further found that the incorporation of the carbonate enables the amount of the chloride incorporated to be reduced from 5–7 per cent to 2–3 per cent, whilst maintaining the retarding effect on the reduction of the rate of hydrolysis of the dried product. The presence of as small a quantity as 0.75 per cent of the chloride exerts an appreciable effect in retarding hydrolysis in the presence of free carbonate.

By the reduction in the quantity of calcium or magnesium chloride from 5–7 per cent to 2–3 per cent the product is rendered less hygroscopic and also less saline to the taste. Moreover the proportion of acetylsalicylate present is increased from 94 to 97 per cent approximately.

In producing the preparations the following general procedure may be employed: To the cold filtered concentrated aqueous solution ("syrup") of an alkaline salt or alkaline earth salt of acetylsalicyclic acid there is added, with even admixture, a small quantity of sodium bicarbonate or sodium carbonate or basic magnesium carbonate ("light magnesium carbonate"). To this mixture there is added a large excess of calcium or magnesium chloride. These salts may be added either in the solid state or in very concentrated aqueous solution. The precipitated calcium or magnesium acetylsalicylate containing admixed calcium carbonate or magnesium carbonate (also magnesium oxide) is filtered on a vacuum filter and pressed or hydroextracted until a sample of the solid dried at 50° C. retains from 2 or 3 per cent of total chloride (anhydrous salt). The product is then dried at about 50° centigrade.

The following example's illustrate this procedure:

Example 1

For the preparation of stabilised calcium acetylsalicylate 42 parts by weight of sodium bicarbonate are taken and suspended in 150 parts by weight of distilled water and to the mixture there is added in small quantities at a time and with constant stirring 90 parts by weight of acetylsalicylic acid (finely ground). When the evolution of carbon dioxide has ceased the cool concentrated aqueous solution ("syrup")— temperature about 10–14° C.—is filtered in vacuo without delay and to the filtered "syrup" there is immediately added 0.67 part of sodium bicarbonate or 0.42 part of sodium carbonate and the whole evenly mixed. This cool mixture is then added in a fine stream to 402 parts by weight of a hot aqueous solution (temperature about 80 to 90° C.) of calcium chloride of specific gravity 1.34 with constant stirring. The precipitated calcium acetylsalicylate admixed with a small quantity of precipitated calcium carbonate is filtered off in vacuo. The filter-cake which also retains a small quantity of mother liquor is pressed or hydroextracted until it retains about 2 or 3 per cent total calcium chloride (as anhydrous salt) admixed with about 0.4 per cent calcium carbonate. The product is then dried at about 50 degrees centigrade.

*Example II*

For the preparation of stabilised magnesium acetylsalicylate 90 parts by weight of finely ground acetylsalicylic acid are suspended in 300 parts by weight of distilled water. To this mixture there is added in small quantities at a time 26 parts by weight of light magnesium carbonate and stirring is continued until evolution of carbon dioxide ceases. The solution is filtered in vacuo and to the clear filtrate there is added about 0.4 part by weight of light magnesium carbonate which, by stirring, is evenly distributed throughout the liquid. To this mixture there is then added by slow additions and with constant stirring 250 parts by weight of solid crystals of hydrated magnesium chloride ($MgCl_2.6H_2O$). The heavy precipitate of magnesium acetylsalicylate which forms on the completion of the addition of the crystals of magnesium chloride is then removed by filtration in vacuo. The filter cake is pressed or hydroextracted until it contains about 3 per cent of total magnesium chloride (anhydrous salt) admixed with about 0.4 per cent of magnesium carbonate with magnesium oxide. The product is then dried at about 50° C. The temperatures at which the various reactions and admixtures take place previous to the final drying process are preferably from 10 to 15° C.

What I claim is:

1. A solid dry preparation containing an alkaline earth salt of acetylsalicylic acid, a minor amount of the chloride of the said alkaline earth, and a minor amount of a carbonate of the said alkaline earth.

2. A solid dry preparation containing magnesium acetylsalicylate intimately mixed with a minor amount of magnesium chloride and a minor amount of magnesium carbonate.

3. A solid dry preparation containing magnesium acetylsalicylate intimately mixed with 2–3% magnesium chloride and 0.25–0.4% magnesium carbonate.

4. A solid dry preparation containing calcium acetylsalicylate intimately mixed with a minor amount of calcium chloride and a minor amount of calcium carbonate.

5. A solid dry preparation containing calcium acetylsalicylate intimately mixed with 2–3% calcium chloride and 0.25–0.4% calcium carbonate.

6. Process for the manufacture of a dry solid product consisting of calcium acetylsalicylate intimately mixed with minor amounts of calcium chloride and calcium carbonate, by adding, with even admixture, to a filtered concentrated aqueous solution of an alkali salt of acetylsalicylic acid, a small quantity of an alkali carbonate, precipitating the said product with an excess of calcium chloride, filtering, extracting liquid until the product retains the desired amount of calcium chloride, and drying.

7. Process as claimed in claim 6 in which the drying is effected at about 45–50° C.

8. Process for the manufacture of a dry solid product consisting of magnesium acetylsalicylate intimately mixed with minor amounts of magnesium chloride and magnesium carbonate, by adding, with even admixture, to a filtered concentrated aqueous solution of the magnesium salt of acetylsalicylic acid, a small quantity of a carbonate of magnesium, precipitating the said product with an excess of magnesium chloride, filtering, extracting liquid until the product retains the desired amount of magnesium chloride, and drying.

9. Process as claimed in claim 8 in which the drying is effected at about 45–50° C.

MYER COPLANS.

REFERENCES CITED

The following references are of record in the file of this patent:

UNITED STATES PATENTS

| Number | Name | Date |
| --- | --- | --- |
| 1,058,904 | Richter | Apr. 15, 1913 |
| 1,431,863 | Altwegg | Oct. 10, 1922 |
| 1,486,002 | Alsleben | Mar. 4, 1924 |
| 1,486,373 | Gerngross | Mar. 11, 1924 |
| 1,716,686 | Crossley | June 11, 1929 |
| 1,764,933 | Coplans | June 17, 1930 |
| 1,969,998 | Wodlinger | Aug. 14, 1934 |
| 2,224,256 | Doushkess | Dec. 10, 1940 |

FOREIGN PATENTS

| Number | Country | Date |
| --- | --- | --- |
| 25,486 | Great Britain | 1912 |